United States Patent [19]

Fasse

[11] 4,001,951
[45] Jan. 11, 1977

[54] BREAST CANCER DETECTION TRAINING DEVICE

[76] Inventor: Wolfgang G. Fasse, 2556 Legion St., Box K, Bellmore, N.Y. 11710

[22] Filed: Mar. 25, 1975

[21] Appl. No.: 561,791

[52] U.S. Cl. .................................................. 35/17
[51] Int. Cl.² ........................................ G09B 23/30
[58] Field of Search ............... 2/267; 3/36; 35/17; 128/479, 481

[56] References Cited

UNITED STATES PATENTS

| | | | |
|---|---|---|---|
| 2,851,692 | 9/1958 | Livingston | 2/267 |
| 3,199,225 | 8/1965 | Robertson | 35/17 |
| 3,562,924 | 2/1971 | Baermann | 35/17 |
| 3,722,108 | 3/1973 | Chase | 35/17 |
| 3,852,833 | 12/1974 | Koneke | 3/36 |

OTHER PUBLICATIONS

"Betsi" Breast Teaching Model, Ortho Pharmaceutical Corp. Publication, May, 1973.

*Primary Examiner*—Harland S. Skogquist
*Attorney, Agent, or Firm*—Wolfgang G. Fasse; Willard W. Roberts

[57] ABSTRACT

The present training device is a body of elastically yielding material, such as foam rubber preferably enveloped by a skin-like cover, for example, of rubber. A plurality of lumps of varying hardness, size and configuration are distributed in the foam rubber body in various locations adjacent to the skin-like envelope as well as deeper in the foam rubber body. The lumps may be made of plastics material and may be distinctly sensed by touching and pressing the outer envelope so as to familiarize a person performing the examination with the symptoms of actual breast cancer.

10 Claims, 3 Drawing Figures

BREAST CANCER DETECTION TRAINING DEVICE

BACKGROUND OF THE INVENTION

The present invention relates to a breast cancer detection training device. It is rather important, that breast cancer be detected as early as possible for a successful treatment. Thus, gynecologists are urging their patients to examine their breasts frequently. However, while the physician may teach the patient theoretically what to "look for" it is normally not possible for a patient to experience the practical sensation of an actually infected breast. For obvious reasons, the physician cannot use an actually infected breast for teaching his patients.

OBJECTS OF THE INVENTION

In view of the above, it is the aim of the invention to provide a training device which will impart to the person being trained a sensation which approximates by artificial means the same or substantially the same sensation as would be experienced by examining an actually infected breast; and to provide a device of the just described type which is relatively cheap to manufacture and may be produced on a mass production scale.

SUMMARY OF THE INVENTION

According to the invention there is provided a breast cancer detection training device, wherein a body of elastically yielding material having a given firmness has embedded therein a plurality of lumps at random locations and of random size, whereby the lumps have a firmness larger than the given firmness of the remainder of the elastically yielding body. The lumps may have varying shapes and sizes so as to resemble breast cancer cells.

BRIEF FIGURE DESCRIPTION:

In order that the invention may be clearly understood, it will now be described, by way of example, with reference to the accompanying drawings, wherein.

Figure 1:
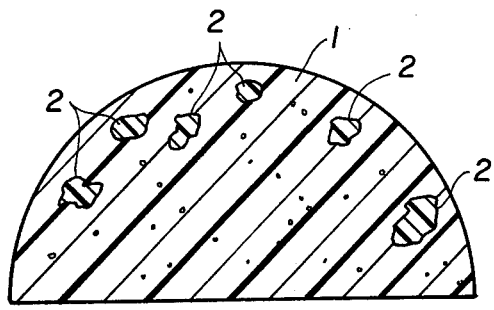
FIG. 1 is a sectional view through a simple embodiment of the training device according to the invention.

DETAILED DESCRIPTION OF EXAMPLE EMBODIMENTS:

Referring to FIG. 1 there is shown in section a foam rubber body 1, for example, of polyurethane having a given firmness. Polyurethane foam rubber or other foam materials are readily available on the market with different grades of firmness. According to the invention there are embedded in the foam rubber body 1 lumps 2 of various shapes and sizes and having a distinctly different firmness as compared to the firmness of the foam rubber body 1. These lumps may, for example, be made of plastics material, for example, NYLON (RTM) or the like. They may also be simply pebbles of various sizes and shapes. In any event these embedded lumps 2 will be formed and shaped so as to approximate natural cancer cells in a human breast.

The lumps 2 are distributed in the body 1 also in a manner resembling the location of actual cancer cells in a human breast. Thus, the lumps 2 may be located close to the surface of the body 1 and also at deeper locations.

Figure 2:
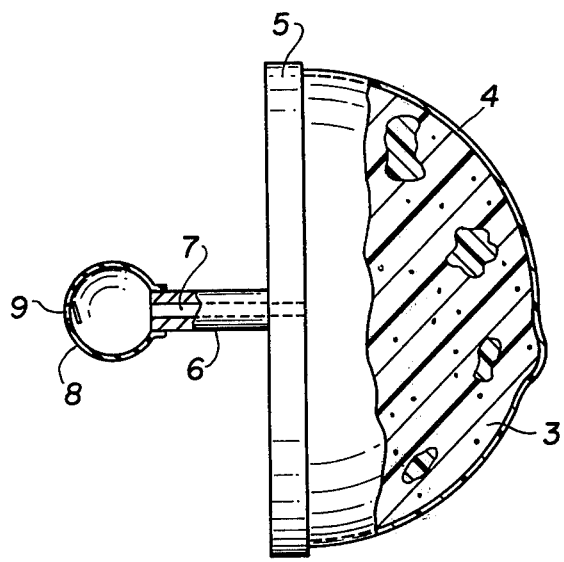
FIG. 2 illustrates a modified embodiment partially in section and simulating the shape of a human breast, the firmness of which is controllable by an air pump.

In FIG. 2 the body 3 of foam rubber or the like is shaped to resemble a human breast. Further, the body is enveloped by a skin-like cover 4 resembling as closely as possible the texture of human skin. Various elastomeric materials, for example, of rubber are available on the market to meet the requirements for the cover 4 which would be air-tight. The body 3 is secured to a frame 5 of plastics material, which will preferably close the body 3. A handle 6 may be secured to the frame 5. The handle 6 is provided with an air passage 7 extending through the frame 5 into the body 3. An air pump 8 with a flap valve 9 may be detachably secured to the handle 6 for controlling the firmness of the body 3 so as to adapt it as closely as possible to varying naturally occurring conditions. The cells of the foam rubber would be interconnected to pass air.

Figure 3:
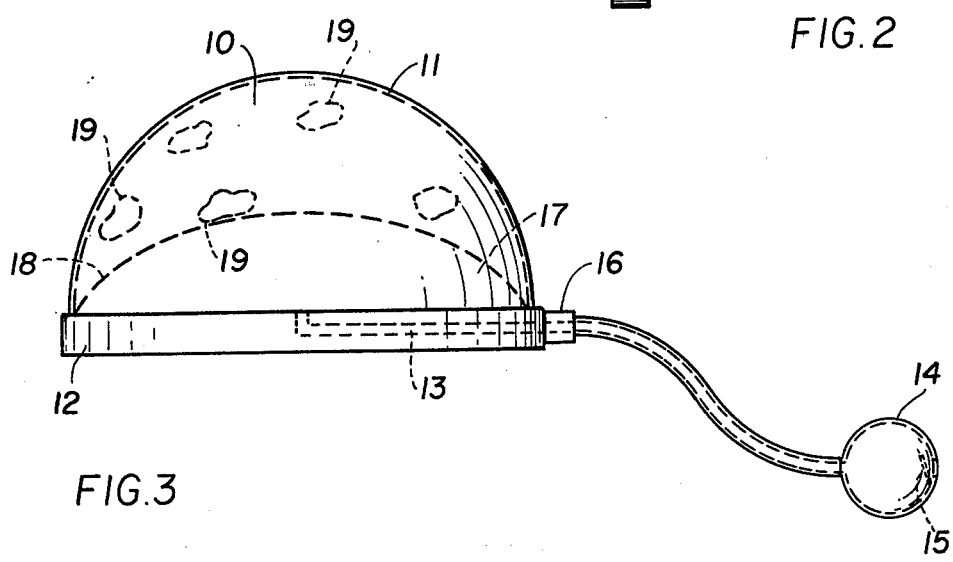
FIG. 3 is a modification of the embodiment according to FIG. 2, and further including a membrane to control the firmness of the body.

FIG. 3 shows a further embodiment similar to that of FIG. 2. The body 10 of FIG. 3 is also covered with a skin-like envelope 11. The frame 12 has an air passage 13 to which may be connected an air pump 14 with a flap-valve 15. An air valve 16 may be provided at the inlet end of the air passage 13 so as to hold the air in the space 17 if desired. The space 17 is closed off against the remainder of the body 10 by a gas-tight membrane 18, for example, of rubber. Thus, a backing, the firmness of which may be varied, is provided for the remainder of the foam rubber body 10 so as to resemble the natural state as closely as possible. The body 10 has also embedded therein the lumps 19, as described above.

In use, the physician may guide the patient's hand over the body to teach the patient with what strength the examining pressure should be applied. Thus, the lumps will impart to the patient a distinct practical feeling of what she is supposed to look for in examining her breasts.

Although the invention has been described with reference to specific example embodiments, it is to be understood, that it is intended to cover all modifications and equivalents within the scope of the appended claims.

What is claimed is:

1. A training device for facilitating the detection of human breast cancer, comprising a body of an elastically yielding material having a given firmness and a plurality of lumps of varying hardness, sizes and configurations permanently embedded in said elastically yielding material at locations where cancer nodules are naturally located, said lumps having a firmness larger than said given firmness, said lumps further resembling, due to said varying hardness, sizes, and configurations, nodules of breast cancer cells said device further comprising an air-tight elastically yielding envelope surrounding said elastically yielding body, and air supply means connected to said body for adjusting the firmness of said body, whereby the location of said lumps may be emphasized by adjusting the air pressure in said body.

2. The device according to claim 1, wherein said elastically yielding material is foam rubber and wherein said lumps are made of plastics material having a firmness larger than that of said foam rubber.

3. The device according to claim 1, wherein said lumps are embedded in said body adjacent to the surface of said body as well as at locations remote from the surface of said body.

4. The device according to claim 1, further comprising an elastically yielding separation wall dividing said body into an outer foam rubber portion and an enclosed air compartment forming a backing for said rubber body, said air supply means including air pump means connected to said rear air compartment for controlling the firmness of said backing to thereby emphasize the location of said lumps above said backing.

5. The device according to claim 1, further comprising an elastically yielding envelope surrounding said elastically yielding body, handle means secured to said body, and air pump means as part of said handle means for adjusting the firmness of said body.

6. The device according to claim 1, wherein said lumps are pebbles of various sizes and shapes.

7. The device according to claim 1, wherein said body is made of foam rubber, and said lumps are made of styrofoam embedded in said foam rubber.

8. The device according to claim 1, wherein said body resembles the shape of a female human breast.

9. The device according to claim 1, further comprising an envelope of elastic material substantially resembling human skin, said envelope encasing said elastically yielding body.

10. The device according to claim 9, wherein said envelope is made of a thin rubber skin.

* * * * *